April 21, 1931.  R. E. ELLIOTT  1,801,730

REAMER ATTACHMENT FOR DIE STOCKS

Filed Dec. 31, 1929

Russell E. Elliott,
INVENTOR.

BY J. Stanley Burch
ATTORNEY.

Patented Apr. 21, 1931

1,801,730

UNITED STATES PATENT OFFICE

RUSSELL E. ELLIOTT, OF BRACKENRIDGE, PENNSYLVANIA

REAMER ATTACHMENT FOR DIE STOCKS

Application filed December 31, 1929. Serial No. 417,795.

This invention relates to improvements in devices particularly adapted for the threading and reaming of pipes and other suitable work.

An object of this invention is to provide a threading and reaming device having a yoke or supporting member for the reamer and a die holder, means for maintaining the yoke in fixed relationship to the die holder, and means cooperating with the yoke member for raising and lowering the reamer.

Other objects of this invention will appear from the following detailed description of the device and as disclosed in the single sheet of drawings which is herewith made a part of this application.

In the drawings

Figure 1:
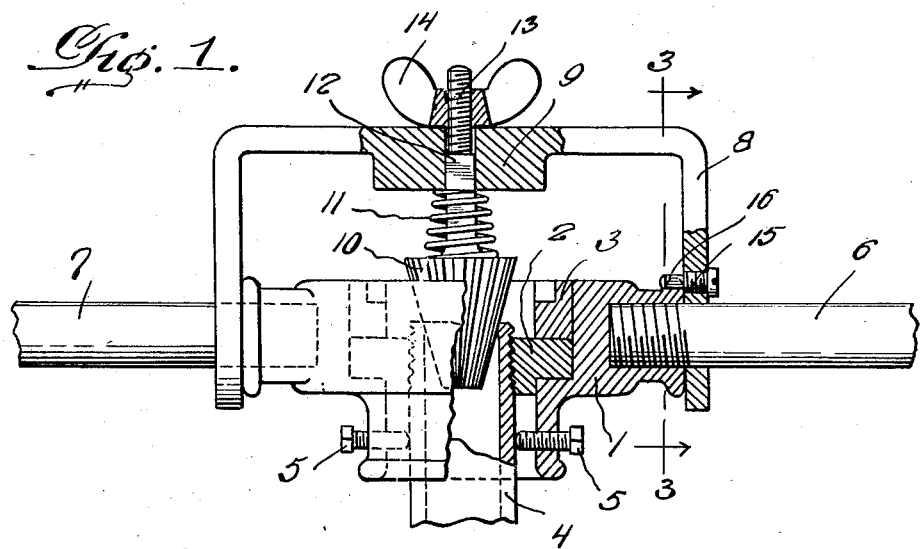
Fig. 1 illustrates the side elevational view of the threading and reaming device, with a portion broken away disclosing sections in detail.
Figure 2:
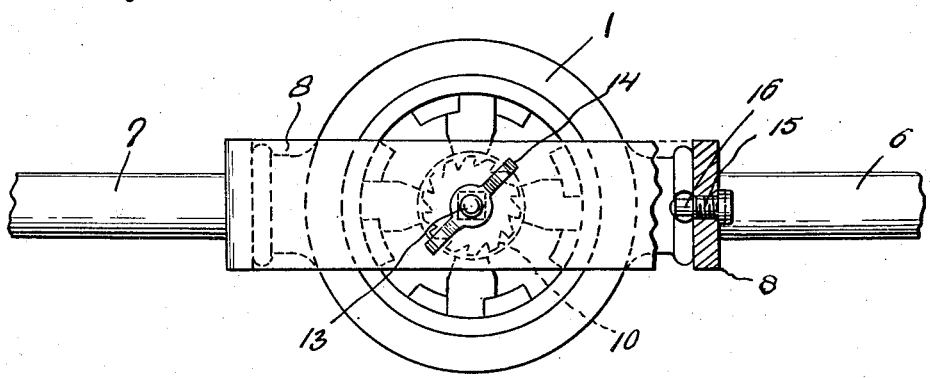
Fig. 2 represents a top plan view of Fig. 1.
Figure 3:
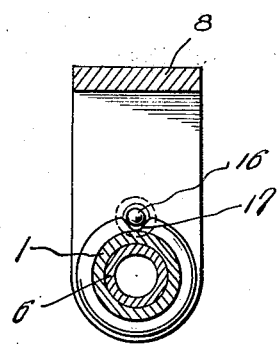
Fig. 3 illustrates a sectional view of Fig. 1 taken along line 3—3.

In the threading and reaming apparatus according to this invention it is preferred that numeral 1 designate the die holder of a suitable type for carrying a die 2, held securely therein by means of a clamping ring 3 or otherwise. The die 2 may be of the ordinary threaded type adapted for threading a pipe 4 or other proper work, which is held in position within the holder 1 by means of set screws 5. A yoke or supporting member 8 for the reamer 10 is preferably mounted upon the handle elements 6 and 7 adjacent the die holder 1, and is of an approximate U shape, having an enlarged portion 9 provided with an opening for slidably receiving a square shank 12 extending from the reamer 10, a conical shaped tension spring 11 is mounted upon the shank 12, the smaller end abutting the bottom of the enlarged portion 9, the larger end contacting with the top of the reamer 10. A threaded portion 13 extends from the shank 12 a suitable distance beyond the yoke 8 for the purpose of receiving a thumb adjusting nut 14, which when turned either exerts pressure through the reamer 10 on the end of the pipe 4, or relieves the pressure as may be desired, the spring element 11 allowing for a necessary resiliency and rebound of the reamer 10 while in operation.

The yoke 8 is maintained in fixed relationship to the die holder 1, whenever desired, by means of a set screw having a threaded portion 15 adapted to extend through the yoke 8, and an extension 16 arranged to cooperate with a notch 17 in the die holder, thereby providing means for preventing the yoke 8 from turning on the handles 6 and 7 or otherwise working out of proper alignment with the die holder during the operation of the device.

This invention provides a very efficient means for adjusting readily the pressure of the reamer upon the work which is under way in the die holder 1, consisting of a thumb nut easily accessible.

It will be understood that many changes and modifications may be made in the form of the embodiment of the invention within the scope of the following claim without departing from the spirit thereof.

What I claim is:

In a threading and reaming device having a reamer and die stock, a U shaped yoke member for supporting the reamer and die stock, the free ends of the U shaped yoke being slidably and adjacently positioned with respect to the outer ends of the die stock, handle portions loosely extending through the ends of the yoke member, and threadably received within the outer ends of the die stock, a notch formed in the periphery of one of the outer ends of the die stock, a screw threadably extending through an adjacent portion of the yoke member and parallel to the handle portions, the screw having an inwardly extending smooth portion for cooperating with the notch thereby providing means for maintaining the yoke in fixed circumferential relation to the die stock and at the same time arranged to allow for movement lengthwise between the handle portions and yoke.

In testimony whereof I affix my signature.

RUSSELL E. ELLIOTT.